Patented Dec. 9, 1941

2,265,211

UNITED STATES PATENT OFFICE 2,265,211

PROCESS OF PRODUCING HIGH-MOLECULAR WEIGHT CARBONYL COMPOUNDS

Alois Waibel and Hermann Zorn, Ludwigshafen-on-the-Rhine, Germany, assignors, by mesne assignments, to General Aniline & Film Corporation, New York, N. Y., a corporation of Delaware No Drawing. Application November 17, 1938, Serial No. 241,018. In Germany November 29, 1937

6 Claims. (Cl. 260—586)

The present invention relates to a process of producing high-molecular weight carbonyl compounds.

It has already been proposed to obtain high-molecular weight aldehydes and ketones by condensing aldehydes or mixtures of aldehydes and ketones which aldehydes and ketones contain at least one reactive methylene or methyl group with an addition of secondary amines or their salts, if desired in the presence of excess of acid.

We have now found that the said condensation can be carried out in a manner which is especially advantageous industrially by removing the water formed in the condensation from the reaction mixture at the rate at which it is formed.

As initial materials for the said process there may be mentioned saturated and unsaturated aldehydes which contain a reactive methyl or methylene group. The term reactive methyl or methylene group is intended to comprise methyl and methylene groups which are in an adjacent position to a carbonyl group or olefinic double linkage. Therefore aldehydes may be employed corresponding to the general formula:

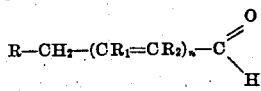

wherein R is a hydrogen atom or an aliphatic, cyclo-aliphatic, aliphatic-aromatic, aromatic or heterocyclic radicle, n is zero or an integral number, $R_1$ and $R_2$ represent hydrogen or an aliphatic, carbocyclic or heterocyclic radicle, which may contain substituents, for example halogen atoms, hydroxy or hydroxyalkyl groups. Suitable aldehydes are for example acetaldehyde, n-butyraldehyde, crotonaldehyde, methylbutenal, stearic aldehyde, oleylaldehyde, furthermore citral, beta-ionylidene-acetaldehyde or phenylacetaldehyde. The said aldehydes may also be employed in admixture with one another or in admixture with aldehydes which contain no reactive methyl or methylene group and which therefore cannot be condensed with one another under the working conditions employed. Aldehydes of the latter kind are for example glyoxal, benzaldehyde, cinnamic aldehyde, ortho- and para-dihydrotoluylaldehyde, furfurol or quinoline-aldehyde. Mixtures of aldehydes with ketones, containing in adjacent position to the carbonyl group a methyl or methylene group, as for example acetone, methyl ethyl ketone or ionone may also be used as initial materials. Mixtures of the said aldehydes with ketones, as for example acetone, methyl ethyl ketone, ionone and the like may also be used as initial materials. The aldehydes and ketones may contain substituents, as for example halogen atoms or hydroxy groups. Such compounds are for example acetaldol and chlorbutyraldehyde. The initial materials are preferably used in as anhydrous a state as possible.

As condensing salts of secondary amines there may be mentioned for example salts of dimethylamine, diethylamine, dibutylamine or dicyclohexylamine. The salts of heterocyclic secondary amines, such as piperidine, piperazine, hydrogenated quinolines, pyrrolidines, morpholine or hydrogenated thiazines or their derivatives are especially suitable. As acid components there may be present in the said salts organic or weak inorganic acids, as for example formic acid, acetic acid, crotonic acid, palmitic acid, oxalic acid or succinic acid, and also substituted carboxylic acids, as for example lactic acid, monochloracetic acid or malonic acid monomethyl ester, and also phosphoric acid or boric acid.

The removal of the water formed during the condensation can be effected in the case of aldehydes or mixtures of aldehydes and ketones having very low vapor pressure, as for example in the case of stearic aldehyde, by simple distillation. It is preferable in this case to work under reduced pressure and/or while leading through indifferent gases, as for example nitrogen. The water formed may also be bound by the addition of water-binding agents which do not react with the initial materials or the reaction products, as for example anhydrous sodium acetate. It is especially advantageous to remove the water by azeotropic distillation with the aid of organic liquids which form with water under the pressure and temperature conditions prevailing constant-boiling mixtures the vapor pressure of which is higher than the vapor pressures of the initial materials and the reaction products. Alcohols, such as methanol, ethanol or butanol, and also ethers, as for example diethyl or dipropyl ether, or dioxane are suitable for example. Generally speaking it is important that under the reaction conditions the organic liquids should not enter into chemical reaction with the carbonyl compounds to be condensed or with the condensing amines or their salts and should not impair the activity of the same. Among such substances there may be mentioned for example hydrocarbons, such as 1-heptylene, isooctane, cyclohexane, benzines of certain boiling ranges and aromatic hydrocarbons, such as benzene, toluene or xylene. There may also be mentioned chlorinated hydrocarbons, such as methylene chloride, trichlorethylene or carbon tetrachloride. In many cases it is possible to use the carbonyl compounds to be condensed as water-removing distilling agents. Care should be taken in this case, however, that after separation of water from the carbonyl compounds distilled off they are all returned to the reaction vessel.

The pressure to be used in the condensation depends on the necessary temperature and also on the nature of the organic liquids available for the azeotropic distillation. In order to obtain as large a yield as possible of straight-chain compounds it is generally speaking preferable to select a comparatively low temperature. It is advantageous to work at from about 30° to 80° C. depending on the aldehyde used and on the catalysts used.

The amount of condensing amine salts to be used depends on the degree of action and on the reactivity of the carbonyl compounds used; this may readily be ascertained by a preliminary experiment. The amine salts may be added in one batch to the reaction mixture before the commencement of the condensation. It is frequently advantageous to add them, if desired dissolved, for example in the solvent used for the azeotropic distillation, in small batches as the condensation proceeds in amounts depending on the progress of the condensation. The same is true for the further addition of inorganic or organic acids. The amount of acid present in the reaction mixture may be modified during the condensation if desired.

The carbonyl compounds to be condensed may be subjected to the reaction at once. In order to obtain good yields of high-molecular weight products, however, it is usually preferable to initiate the condensation with only a part of the initial materials and to add further amounts of aldehyde, with or without ketone, to the reaction mixture as the condensation proceeds according to the rate at which it progresses, and if desired to remove a part of the condensation products. The liquid used for the azeotropic distillation is preferably returned to the reaction vessel at the rate at which it distils off, and if desired fresh initial material and/or condensing salts of amines may be added thereto. The condensation may also be carried out in the presence of solvents in the choice of which it should be borne in mind that they should neither react under the working conditions used with the substances present in the reaction mixture not distil over therewith. By suitable choice of the said solvents, the nature and the molecular size of the substances formed by the condensation can frequently be influenced to a great extent.

According to this invention mixtures of high-molecular weight unsaturated aldehydes or ketones are obtained. They generally have a high content of compounds with straight carbon chains provided the initial materials permit of the formation of such substances. Thus for example by the condensation of crotonaldehyde, there are obtained in very good yields mixtures of high-molecular weight aliphatic polyene aldehydes. Whereas for example by the condensation of mixtures of cinnamic aldehyde and crotonaldehyde, phenyl-polyene aldehydes are obtained. The products are freed from condensing agents and other impurities and by-products contained therein by washing with water or suitable solvents, as for example methanol. Some of the products are liquid and some are solid and they are more or less deeply colored depending on the number of double linkages present therein. In many cases they may be separated into different fractions by distillation in vacuo. The solid condensation products may also be separated from each other by crystallization from different solvents. The lower molecular weight condensation products may, if desired after the addition of fresh initial materials, be resubjected to condensation, whereby they may also be converted into high-molecular weight products.

The unsaturated aldehydes and ketones obtained may be converted by reduction of the carbonyl groups into the corresponding unsaturated alcohols. By using reducing and hydrogenating agents, the condensation products may, however, also be converted in the corresponding saturated aldehydes, ketones or alcohols. Generally speaking it is advantageous in this case to work in the presence of solvents. By using special hydrogenating agents, it is possible to effect substantially only a partial hydrogenation of the double linkages present and thus to obtain partially unsaturated aldehydes, ketones or alcohols. The resulting aldehydes and ketones may if desired be used as initial materials for the said process for the preparation of still higher molecular weight condensation products.

The following examples will further illustrate the nature of this invention but the invention is not restricted to these examples. The parts are by weight.

*Example 1*

Into a reaction vessel of about 8 litres capacity which is connected to a distillation column provided with a dephlegmator there is introduced a mixture of 2 kilograms of benzene and 1 kilogram of glacial acetic acid which is heated while stirring and excluding oxygen. By suitable adjustment of the pressure (to about 250 millimetres), a boiling temperature of from about 50° to 55° C. is maintained. To the boiling mixture there is added 0.7 kilogram of pure anhydrous crotonaldehyde and then, through a special supply, one quarter of a solution of 100 grams of anhydrous morpholine in 400 grams of benzene is added during the course of about 10 minutes. A strong separation of water immediately sets in. The water split off, together with the benzene, distils over as an azeotropic mixture which is separated by means of the dephlegmator. The mixture of benzene and water distilled over is separated and the benzene is returned to the reaction vessel. After about 2 hours, the separation of water slowly subsides. Another 1.3 kilograms of crotonaldehyde are then added in the course of four hours, and also the remainder of the morpholine solution in small portions and uniformly, the reaction mixture being then kept boiling at 55° C. for a further 3 hours. By vacuum distillation at 40° C. the benzene is distilled off and then the greater part of the excess glacial acetic acid. The reaction product is cooled to about 10° C. and stirred with methanol. The product separated is filtered off by suction, washed with a little methanol and then washed thoroughly with water. After drying in vacuo, 0.8 kilogram of a red-brown product is obtained which consists of higher polyene aldehydes, as for example dodecapentaenal and hexadecaheptaenal.

The filtrate containing methanol is combined with the washing water and the mixture extracted with ether. The ethereal solution is washed with dilute hydrochloric acid and then with water and then dried. After distilling off the ether, 0.7 kilogram of a mixture of unsaturated aldehydes having a carbon atom number of 8 and more is obtained which may be separated by fractional distillation in vacuo.

100 parts of the resulting dried filter residue are stirred with about 20 times the amount of normal octyl alcohol and then hydrogenated under pressure with an addition of 15 parts of a nickel catalyst (prepared according to Raney see Journal of the Am. Chem. Soc., vol. 54, p. 4116 (1916)). After separating the catalyst and the solvent used, 80 parts of an alcohol mixture are obtained. By fractional distillation in vacuo there are obtained therefrom 15 parts of dodecyl alcohol, 50 parts of cetyl alcohol and 15 parts of a mixture of higher molecular weight alcohols.

The above mixture of aldehydes obtained from the filtrate is dissolved in twice the amount of butanol and hydrogenated in the same way. There is obtained 0.7 kilogram of a liquid mixture of higher alcohols having a carbon atom number of 8 and more.

Example 2

2 kilograms of pure anhydrous crotonaldehyde are condensed as described in Example 1. After the condensation, benzene is distilled off in vacuo to such an extent that the volume of the contents of the vessed is only 4 litres the whole is then cooled to 10° C.

The separated products are filtered off and washed with benzene and worked up as described in Example 1. There is obtained 0.7 kilogram of a mixture of higher polyene aldehydes.

The filtrate, after the addition of 0.1 kilogram of glacial acetic acid, is returned to the reaction vessel, 2 kilograms of crotonaldehyde and a solution of 100 grams of morpholine in 400 grams of benzene are added and subjected to reaction in the same way as described in Example 1. As soon as the reaction is ended, the reaction mixture is worked up in the manner described in Example 1. 1.3 kilograms of a dried filter residue are thus obtained and from the filtrate there is obtained 0.9 kilogram of a mixture of unsaturated aldehydes.

Example 3

A mixture of 1.4 kilograms of benzaldehyde, 0.6 kilogram of commercial cyclohexanone and 3 kilograms of toluene is charged into the apparatus described in Example 1, the mixture then being heated to boiling under atmospheric pressure. A warm solution of 150 grams of piperidine acetate in toluene is then added in the course of an hour, whereby reaction occurs. The water split off in the reaction distils off together with toluene as an azeotropic mixture in the rate at which it is formed. The condensed toluene and water are then separated from one another and the toluene is continuously returned to the reaction mixture. After the finishing of the condensation the toluene and the unaltered initial substances are distilled off. The residue which solidifies on cooling is washed with ethyl alcohol. Thus 1.2 kilograms of 2.6-dibenzyl-idene-cyclohexane-one-(1) are obtained.

Example 4

To a mixture of 2.4 kilograms of glacial acetic acid and 110 grams of monochlor acetic acid and 3 liters of benzene contained in an apparatus as described in Example 1 there are added at normal temperature while intensely stirring a mixture of 100 grams of morpholine and 400 cubic centimeters of benzene within 15 minutes. The mixture is then subjected to a distillation in the manner as indicated in Example 1 at 55° C. under a pressure of about 250 millimeters while excluding oxygen. To the boiling mixture there is added 1 kilogram of crotonaldehyde for about 1 hour and during the following two hours a further amount of 1.1 kilograms of crotonaldehyde is introduced. The reaction mixture is then kept for two hours at 55° C., the benzene distilled off is continuously returned to the reaction vessel. Then the main part of the benzene is distilled off. The residue is cooled down to about 10° C. whereby it solidifies. Any liquid constituents are filtered off by suction. The residue is then washed with 0.5 kilogram of glacial acetic acid and benzene. The filtrate is returned to the reaction vessel. The residue is then again washed for several times with methanol and stored while excluding oxygen.

To the filtrate from the aforesaid batch contained in the reaction vessel there is added the benzene distilled off and then a mixture of 50 grams of morpholine and 200 cubic centimeters of benzene. At a temperature of 55° C. 1.4 kilograms of crotonaldehyde are added within 2½ hours. Then the mixture is subjected to a distillation for further 90 minutes, the benzene distilled off is continuously returned to the reaction vessel. Thereupon the benzene and a part of the glacial acetic acid is distilled off. The reaction product is cooled down to about 10° C. and at this temperature stirred with 1 liter of methanol. Then it is freed from the liquid by suction and washed with aqueous methanol of 75 per cent strength. The residue obtained is added to that obtained in the first stage. The filtrates can be employed for carrying out further charges.

The solid residues are stirred with 20 liters of butanol and after adding 200 grams of a nickel catalyst are hydrogenated under elevated pressure. After removing the catalyst and the butanol 2 kilograms of a mixture of higher molecular aliphatic alcohols are obtained which are solid at normal temperature. By subjecting it under diminished pressure to a fractionated distillation n-dodecyl and n-hexadecyl alcohol are obtained besides other higher molecular alcohols.

What we claim is:

1. The process of producing high-molecular weight carbonyl compounds by condensing a carbonyl compound containing at least one group selected from the class consisting of methylene and methyl groups in the presence of a substance selected from the class consisting of secondary amines and salts thereof, which consists in carrying out the condensation while removing the water formed in the condensation from the reaction mixture at the rate at which it is formed.

2. The process of producing high-molecular weight carbonyl compounds by condensing a carbonyl compound containing at least one group selected from the class consisting of methylene and methyl groups in the presence of a substance selected from the class consisting of secondary amines and salts thereof which consists in carrying out the condensation in the presence of an organic solvent capable of forming an azeotropic mixture with water and removing the water formed in the condensation from the reaction mixture at the rate at which it is formed by distillation.

3. The process of producing high-molecular weight carbonyl compounds by condensing a carbonyl compound containing at least one group selected from the class consisting of methylene and methyl groups in the presence of a substance selected from the class consisting of secondary amines and salts thereof which consists in carrying out the condensation in the presence of a liquid monocyclic aromatic hydrocarbon capable of forming an azeotropic mixture with water and removing the water formed in the condensation from the reaction mixture at the rate at which it is formed by distillation.

4. The process of producing high-molecular weight carbonyl compounds by condensing a mixture of carbonyl compounds containing at least one group selected from the class consisting of methylene and methyl groups in the presence of a substance selected from the class consisting of secondary amines and salts thereof which consists in carrying out the condensation in the presence of an organic solvent capable of forming an azeotropic mixture with water and removing the water formed in the condensation from the reaction mixture at the rate at which it is formed by distillation.

5. The process of producing high-molecular weight carbonyl compounds by condensing crotonaldehyde in the presence of a substance selected from the class consisting of secondary amines and salts thereof which consists in carrying out the condensation in the presence of an organic solvent capable of forming an azeotropic mixture with water and removing the water formed in the condensation from the reaction mixture at the rate at which it is formed by distillation.

6. The process of producing high-molecular weight carbonyl compounds by condensing a mixture of cyclohexanone and benzaldehyde in the presence of a substance selected from the class consisting of secondary amines and salts thereof which consists in carrying out the condensation in the presence of a liquid monocyclic aromatic hydrocarbon capable of forming an azeotropic mixture with water and removing the water formed in the condensation from the reaction mixture at the rate at which it is formed by distillation.

ALOIS WAIBEL.
HERMANN ZORN.